June 10, 1958  L. O. FRENCH  2,838,037
APPARATUS FOR INTRODUCING A MIXTURE OF FUEL AND
AIR INTO THE COMBUSTION CHAMBER
OF AN INTERNAL COMBUSTION ENGINE
Filed March 2, 1956
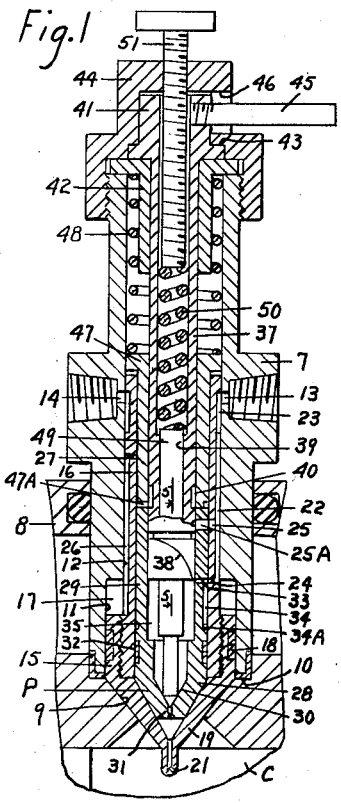
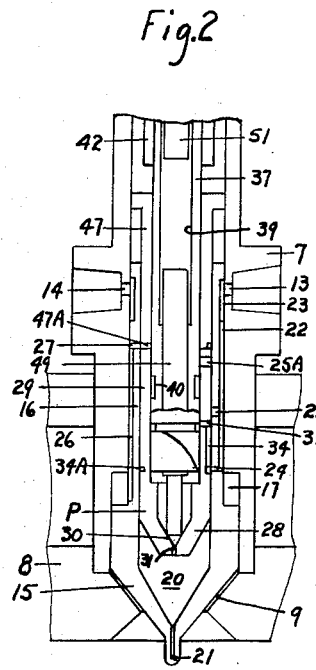
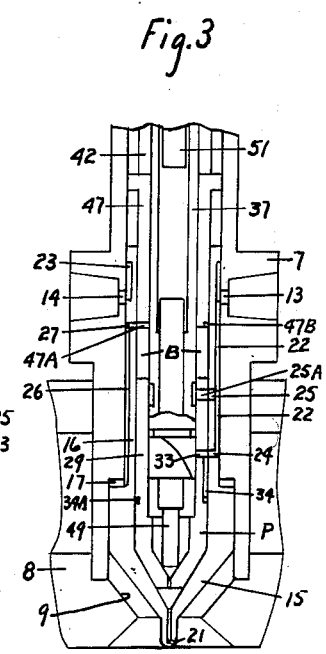
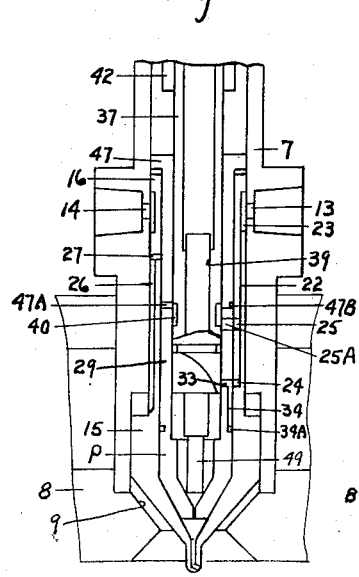
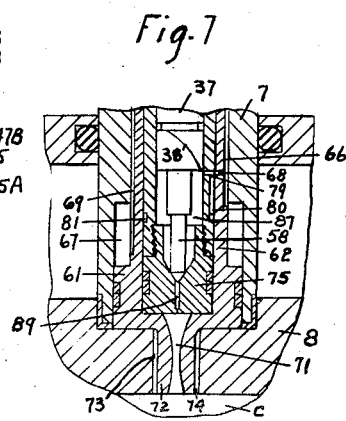
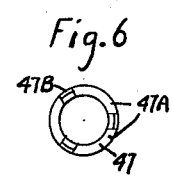
INVENTOR.
Louis O. French United States Patent Office 2,838,037
Patented June 10, 1958

2,838,037

APPARATUS FOR INTRODUCING A MIXTURE OF FUEL AND AIR INTO THE COMBUSTION CHAMBER OF AN INTERNAL COMBUSTION ENGINE

Louis O. French, Milwaukee, Wis.

Application March 2, 1956, Serial No. 569,102

17 Claims. (Cl. 123—139)

The invention relates to internal combustion engines and more particularly to apparatus for introducing a mixture of fuel and air into the combustion chamber of the engine.

Precombustion or anti-chamber type engines are preferred by some engine manufacturers because they will handle a wide range of fuels including so termed cheap fuels. In the usual precombustion or anti-chamber internal combustion engines the fuel is sprayed into the chamber before the end of the compression stroke and allowed to ignite therein and eject itself into the main combustion chamber, but no provision is made for adjusting the timing of the introduction of the fuel into the chamber while the engine is running, and the chamber is not scavenged of waste products. In another type of anti-chamber internal combustion engine fuel is introduced at low pressure into a cup having restricted communication with the combustion chamber, air under compression is forced into the cup and near the end of the compression stroke a crankshaft timed plunger is moved down into the cup forcing the partial mixture of fuel and air into the combustion chamber of the engine, but no means are provided for adjusting the timing of the plunger when the engine is running and sometimes rough running results. The object of the present invention is to provide an anti-chamber type apparatus for internal combustion engines in which the time of introduction of the fuel into the anti-chamber can be adjusted or controlled while the engine is running and to improve on the second type of anti-chamber above mentioned by providing an expansible anti-chamber into which fuel is sprayed from one end while air enters through the restricted communication at the other, thereby obtaining a better fuel air mixture and then expelling this mixture near the end of the compression stroke into the main combustion chamber. More particularly, the fuel is introduced into the anti-chamber by a compression pressure operated pump piston forming a part of the chamber, and the mixture of fuel and air is ejected from this chamber under the action of a compression pressure operated expelling piston, thereby eliminating the usual engine operated cam timed mechanical equipment for operating the fuel pump and the expulsion plunger heretofore referred to.

A further object of the invention is to provide a compression pressure operated fuel metering and fuel-air mixture expelling apparatus in which the operating piston for the fuel pump acts as a timing valve for the operation of a fuel mixture expelling piston.

A further object of the invention is to provide a compression pressure operated fuel metering and fuel-air mixture expelling apparatus in which a compression pressure operated operating piston for the fuel pump is checked in its outward movement by hydraulic pressure set up by the compression pressure acting on a fuel-air mixture expelling piston.

A further object of the invention is to provide a compression pressure operated fuel metering and fuel-air mixture expelling apparatus in which a compression pressure operated operating piston for the fuel pump is checked in its outward movement and then moved inwardly by hydraulic pressure set up by the compression pressure acting on a fuel-air mixture expelling piston, thereby greatly reducing the stroke of this piston so that the discharge from this piston into the combustion chamber of the engine is facilitated.

The invention further consists in the several features hereinafter set forth and more particularly defined by claims at the conclusion hereof.

In the drawings:

Fig. 1 is a vertical sectional view through an apparatus embodying the invention;

Figs. 2, 3, and 4 are diagrammatic views showing the parts in different positions during the operating cycle, the springs being omitted and parts being broken away;

Fig. 5 is a detailed vertical sectional view taken on the line 5—5 of Fig. 1;

Fig. 6 is a plan view of the lower end of one of the parts;

Fig. 7 is a detailed vertical sectional view showing certain modifications.

Referring to the drawings, the numeral 7 designates a housing whose lower end extends through the water jacket space in the head 8 or cylinder of an internal combustion engine to an opening 9 and is held therein and against an annular flange 10 of said head in any suitable manner. Housing 7 has differential diameter bores 11 and 12, a fuel inlet port 13, and a fuel outlet port 14 communicating with the bore 12.

A differential diameter fuel-air mixture expelling piston has a head portion 15 working in the bore 11 and a tubular portion 16 working in the bore 12 and cooperating therewith to form a chamber 17 which has checking, timing, cooling, and lubricating functions.

The head portion 15, having threaded engagement with tubular portion 16, carries sealing rings 18 and has bottom portion 19. The bore of the tubular portion is extended down to said bottom portion and forms therewith and with the operating piston P an anti-chamber 20 in the position of the parts as shown in Fig. 2. The bottom portion 19 may have spray orifices 21, one being indicated, providing a restricted communication between the chamber 20 and the combustion chamber C of the engine. The portion 16 has a checking liquid inlet groove 22 extending from the chamber 17, when in a filling position, to an annular groove 23 registering with ports 13 and 14 and also communicating with ports 24 and 25. Portion 16 also has a checking liquid outlet groove 26 communicating with a restricted port 27.

The operating piston P is a cylindrical member working in the bore of the tubular portion 16 and has a head portion 28 and a tubular portion 29. The head has a centrally disposed valve seat 30 and a fuel discharge passage 31, terminating in spray orifice, if desired, leading therefrom and may carry sealing rings 32. Portion 29 has an inlet and spill port 33, a groove 34 (terminating in an annular oil groove 34a) for connecting the fuel pump chamber 35 with the port 24. It also has a port 25A.

The mixture expelling piston and the operating piston are held against rotary movement by a key 36 working in key slots or recesses 36A and 36B in the tubular portions of these pistons as shown in Fig. 5.

A fuel pump plunger 37 works in the bore of the tubular portion 29 and is provided with a by-pass scroll or recess including a control edge 38, which depending upon the angular adjustment of said plunger, permits fuel from the pump chamber 35 to be released sooner or later through the port 33. Plunger 37 has a lengthwise extending bore 39, an annular groove 40, and a flanged head 41 which is mounted for rotary movement between a flanged tubular fixed stop 42, abutting the top of the housing, and an annular shoulder 43 in a cap 44 in threaded engagement with the housing and in clamping engagement with said stop. Head 41 carries an operating handle 45 for manual or governor control or both that extends through an arcuate slot 46 in the cap for angular adjustment of the plunger.

A flanged movable stop and liquid ejection sleeve 47 having recessed portions 47a and connecting arcuate recesses 47b (Fig. 6) works between a portion of the tubular portion 16 and the plunger 37 and is normally held in abutting engagement with the outer end of portion 29 by a spring 48.

A differential diameter fuel discharge control needle valve 49 is slidably mounted in the bore 39, its lower smaller diameter end normally seating on the seat 30 and held closed by a spring 50 also mounted in an enlargement of bore 39 and adjustably tensioned by an exteriorly adjustable screw 51 in threaded engagement with the cap 45.

With the above construction, fuel from a suitable low pressure circulatory system and including a cooler is constantly circulated from port 13 to 14 via groove 23, and some of this passes down the groove 22 to the chamber 17 and through ports 24 and 33 to the pump chamber 35 filling these chambers. During the compression stroke when the gases in the combustion chamber C and acting on the exposed portion of heads 19 and 28 overcome the initial loadings of the springs 48 and 50, the expelling piston and the operating piston P are moved upwardly until the lower end of groove 22 is lapped by the housing and port 33 is lapped by the plunger 37, thereby trapping checking liquid in chamber 17 and fuel in the pump chamber. Since the exposed diameter of the heads 19 and 28 are of less area than their main body portions, loadings of either or both of the springs 48 and 50 can be less than if the full diameter of the heads 19 or 28 were initially exposed. With liquid trapped in chamber 17, since the area of this chamber is less than that of the now fully exposed lower end of the head, the liquid therein will be at a higher pressure than the compression pressure, thus acting as a seal to prevent leakage of gases into this chamber should the rings 32 fail to prevent such leakage. The liquid in chamber 17 hydraulically locks the expelling piston against movement, and now as the compression pressure increases, the gases passing through the restricted opening or openings 21 act against the reduced diameter end of piston P, but this piston does not move until the compression pressure has been built up to such an extent that the pressure generated in the pump chamber 35 and acting upon the relatively small differential area between the needle and the stem of the valve 49 is able to lift the valve against the loading of the springs 50 so that again the spring 50 does not need to be as heavy or as heavily loaded as it would be if it had to act in direct opposition to the compression pressure building up in the engine. The time that the compression pressure does act is determined by the adjustment of the spring 50 by the exteriorly adjustable screw 51 which as shown is adjusted manually at the injector but which can by the well known expedient of a rack and pinion connection be remotely controlled either manually or by a governor or both. The valve 49 is timed to open near the end of the compression stroke, for example, within thirty to five degrees of dead center. With the valve open, the operating piston moves upwardly quickly and discharges or sprays fuel into the chamber 20 as the volume of this chamber expands and as the air from the combustion chamber C enters the lower end thereof until the port 33 passes the control edge 38, thereby connecting the chamber 35, port 33, through groove 34, ports 24 and 25, groove 22 with the supply. As soon as this occurs, the pressure in chamber 35 drops so that the valve 49 closes, and now piston P together with the closed valve 49 and the sleeve 47 move outwardly until said piston P completes its stroke as shown in Fig. 2. Now the piston P and the sleeve 47 are registered with the restricted port 27, and since the per unit pressure of the liquid in chamber 17 is much greater than the per unit gas pressure acting on the tubular area of the operating piston, this fluid passing into the recesses 47a and grooves 47b and acting on both the piston P and sleeve 47 forces the piston P and the sleeve 47 apart against the loading of the spring 48 on the sleeve, and the gas loading on the tubular portion 29 of the operating piston so that the piston P is hydraulically stopped from further upward movement and then its travel is reversed while the expelling piston moves upwardly and the sleeve 47 under hydraulic pressure is moved upwardly into engagement with the fixed stop sleeve 42 at which time the displacement of liquid from chamber 17 brings the head of the expelling piston into abutting engagement with the operating piston P, the parts being in the position approximately shown in Fig. 3 when injection of the charge has been completed.

It is to be noted that the ratios of area between the annular chamber 17 and the annular area of the tubular portion 29 and like area of sleeve 47 are about two and one-half to one so that even though a rise in pressure in the chamber 20 occurs due to precombustion of some of the fuel in this chamber while the operating piston is making its outward stroke, this rise in pressure will not prevent the cycle of events above described taking place, it being noted that any such rises in pressure are momentary and that through the ejection of fuel from the chamber, the pressures in the combustion chamber acting on the large annular area of the expelling piston heretofore referred to are also increased.

Now the fuel and air mixture has been expelled into the combustion chamber and is burning therein on the working stroke while the liquid left in the chamber 17 and the then formed chamber B forms a hydraulic lock to prevent further movement of the pistons during ignition of the main charge and the high pressure period of the engine's cycle following ignition. It is to be noted that because of the restricted communication between the chamber 20 and the combustion chamber the contact of the pistons within each other as shown in Fig. 3 is cushioned.

When the pressures in the combustion chamber during the working stroke have dropped sufficiently, the springs 50 and 48 act to move the pistons and the sleeve 47 downwardly, and as soon as this occurs, liquid from the chamber B tends to move back into the chamber 17, and as this occurs, the sleeve 47 moves down until it laps the port 27 so that only a relatively small amount of liquid by-passed from chamber 17 to chamber B is returned to chamber 17 and then the piston P and the sleeve 47 with a liquid column between them move down until the top of tube 29 registers with the annular groove 40. Instantly the sleeve 47 under action of the loaded spring 48 moves downwardly or inwardly to expel the liquid from the chamber B via groove 40, ports 25a and 25 then in register therewith, grooves 22 and 23 to the supply as illustrated in Fig. 4 so that the greater portion of the checking liquid is expelled and new and cooled liquid can be supplied to the chamber 17 on the next cycle so that it will act to cool and lubricate the expelling piston and through it act to cool the operating piston P which is also cooled by each new fuel charge. Thereafter, the pistons and the sleeve under the action of the springs 48 and 50 move inwardly to their initial position ready for the next cycle.

The modification shown in Fig. 7 is identical with the first form except for variations in the head ends of the pistons. The cylinder head, housing, and relatively fixed plunger are identical similar parts of the first form and similarly numeralled. The valve 58 is identical with the valve 59.

The operating piston has a head portion 75 in threaded engagement with a tubular portion similar to part 29 and is provided with a discharge passage 89 controlled by the valve 58. This piston has a spill port 79, grooves 80 and 81 similar to port 33, grooves 34 and 34A of the first form.

The expelling piston of one piece has a head part 61 working in the larger of the differential bores of the housing and a tubular part 62 working in the smaller of said bores. The grooves 66 and 69 in part 62 are similar to the grooves 22 and 26 and the port 68 similar to port 24. The head 61 has a passage 71 providing restricted communication between the combustion chamber C of the engine and the expansible chamber formed by the outward movement of the operating piston as described above in connection with the piston P. The passage 71 also extends through an extension 72 working in a bore 73 in the head 8 and is provided with air clearance grooves 74.

The pump chamber 87 and the checking chamber 67 are similar to chambers 35 and 17.

Since the upper portion of this structure is identical with that of Fig. 1, it has been omitted. This form has the same mode of operation as the first form.

It is to be noted that in the modified form shown in Fig. 7 it is possible to so time the operation of the device as to allow the pump piston at the beginning of its stroke to furnish a portion of its charge direct to the passage 71 so as to act as a pilot fuel charge for the remainder of the charge produced as above described through the action of the two pistons.

The apparatus above described has been more particularly designed for use in a compression ignition oil engine, but if desired, it could be used in an engine operating on gasoline by using a lubricant for the checking chamber and its associated parts and providing a separate supply of fuel to the pump chamber, in which instance the timing might be advanced to an earlier period in the compression stroke.

It is believed that the inventive concept of the apparatus above described is new regardless of the use of compression pressure as a motivating force, and I, therefore, desire it to be understood that this invention is not to be limited to any particular form or arrangement of parts except in so far as such limitations are included in the claims.

What I claim as my invention is:

1. In an internal combustion engine, the combination with an engine wall having an opening communicating with the combustion space of the engine, of a pair of telescopically mounted pistons movable relative to said opening, one of said pistons being a mixture expelling piston having a prechamber in restricted communication with the combustion space of the engine, the other of said pistons being a reciprocatory fuel pump member working in said prechamber and cooperating therewith to expand and contract said chamber, means for spraying fuel into said chamber while moving said fuel pump member relative to said expelling piston to expand said chamber near the end of the compression stroke of the engine, and means for moving said pistons relative to each other and the expelling piston relative to said opening to contract said chamber to expel the mixture of fuel and air therefrom directly after said fuel pump member has completed its outward stroke.

2. In an internal combustion engine, the combination of a housing opening into the combustion space of the engine, a compression pressure operated mixture expelling piston working in said housing and having a prechamber in constant restricted communication with said combustion space, a fuel pump having relatively movable parts including a compression pressure operated operating piston working in said prechamber and cooperating with said expelling piston to expand and contract said prechamber, said operating piston having a pump discharge passage communicating with said prechamber to supply fuel thereto, and means controlling the movement of said expelling piston by engine gases under compression to cause its movement directly after said operating piston has completed its outward stroke, to expel the mixture of fuel and air in said prechamber into the combustion space of the engine.

3. The structure as defined in claim 2, wherein said last named means includes a part of said operating piston acting as a timing valve.

4. The structure as defined in claim 2, wherein the last named means includes a liquid containing space in which the liquid is put under checking pressure by said expelling piston and a compression pressure operated timed valve acts to control the release of liquid from said space to permit movement of said expelling piston.

5. In an internal combustion engine, the combination of a housing, a compression pressure operated mixture expelling piston working in said housing and having a prechamber in constant restricted communication with the combustion space of the engine, a fuel pump having relatively movable parts including a compression pressure operated operating piston working in said prechamber and cooperating with said expelling piston to expand and contract said prechamber, said operating piston having a pump discharge passage communicating with said prechamber to supply fuel thereto to mix with air passing into said chamber through said restricted communication, said fuel pump having an exteriorly controlled adjustably loaded discharge control valve acting as a timing valve for the movement of said operating piston.

6. In an internal combustion engine, the combination of a housing, a compression pressure operated mixture expelling piston working in said housing and having a prechamer in constant restricted communication with the combustion space of the engine, a fuel pump having relatively movable parts including a compression pressure operated operating piston working in said prechamber and cooperating with said expelling piston to expand and contract said prechamber, said operating piston having a pump discharge passage communicating with said prechamber to supply fuel thereto to mix with air passing through said restricted communication, said fuel pump having an exteriorly controlled adjustably loaded fuel discharge control valve acting as a timing valve for said operating piston, and means operatively connecting said pistons whereby said operating piston acts as a timing valve for said expelling piston.

7. In an internal combustion engine, the combination of a housing, a compression pressure operated mixture expelling piston working in said housing and having a prechamber in constant restricted communication with the combustion space of the engine, a fuel pump having relatively movable parts including a compression pressure operated operating piston working in said prechamber and cooperating with said expelling piston to expand and contract said prechamber, said operating piston having a pump discharge passage communicating with said prechamber to supply fuel thereto to mix with air passing into said chamber through said restricted communication, and exteriorly adjustable means for timing the beginning of movement of the operating piston, said expelling piston cooperating with said housing to form a liquid receiving chamber, said operating piston acting as a timing valve controlling the release of liquid from said chamber and the consequent movement of said expelling piston.

8. In an internal combustion engine, the combination of a housing opening into the combustion space of the engine, a pair of telescopically mounted pistons, one of said pistons working in said housing and being a mixture expelling piston having a prechamber formed therein in constant restricted communication with the combustion space of the engine, the other of said pistons being a fuel pump member working in the expelling piston and cooperating therewith to expand and contract said prechamber, means for spraying fuel into said prechamber while moving said fuel pump member relative to said expelling piston to expand said prechamber, and means for moving said pistons toward each other to contract said prechamber to expel the mixture of fuel and air therefrom into said combustion space directly after said fuel pump member has completed its outward stroke.

9. In an internal combustion engine, the combination of a housing, a compression pressure operated mixture expelling piston working in said housing and having a prechamber in constant restricted communication with the combustion space of the engine, and a fuel pump having relatively movable parts including a compression pressure operated operating piston working in said prechamber and cooperating with said expelling piston to expand and contract said prechamber, said expelling piston cooperating with said housing to form a liquid receiving chamber, the release of liquid from which is controlled by said operating piston whose expansible movement is in turn checked by liquid so released.

10. The structure as defined in claim 9, wherein means are provided to confine the liquid released from said liquid receiving chamber to first check the expansible movement of the operating piston and thereafter move said operating piston inwardly so that it meets the expelling piston as it moves outwardly to contract the chamber containing the mixture of air and fuel.

11. The structure as defined in claim 10 together with means for returning a portion of the released liquid to waste.

12. The structure as defined in claim 9 together with means for returning a portion of the released liquid to waste.

13. In an internal combustion engine, the combination of a housing, a compression pressure operated fuel mixture expelling piston having restricted communication with the combustion chamber of the engine and cooperating with said housing to form a liquid receiving chamber, a fuel pump having relatively movable parts including a compression pressure operated operating piston cooperating with said expelling piston to form an expandible and contractible chamber, said operating piston having a pump discharge passage communicating with said last named chamber, the restricted communication of the expelling piston also communicating with said last named chamber to provide a mixture of fuel and air therein, and means forming a chamber for liquid released from said liquid receiving chamber to check the outward movement of both pistons.

14. The structure as defined in claim 13, wherein the last named means includes a spring loaded piston member movable with and relative to said operating piston and operable to expel liquid from the chamber that acts to check the outward movement of both pistons.

15. In an internal combustion engine, the combination of a housing, a compression pressure operated fuel mixture expelling piston having restricted communication with the combustion chamber of the engine and cooperating with said housing to form a liquid receiving chamber, a fuel pump having relatively movable parts including a compression pressure operated operating piston and a pump plunger fixed against longitudinal movement but angularly adjustable to provide an adjustable fuel by-pass, said operating piston cooperating with said expelling piston to form an expandible and contractible chamber, said operating piston having a pump discharge communicating with said last named chamber, the restricted communication of the expelling piston also communicating with said last named chamber to provide a mixture of fuel and air therein, and a spring loaded hydraulically operated piston member mounted on said pump plunger in abutting engagement with the outer end of said operating piston and movable under the action of liquid released from said liquid receiving chamber to a stop position and cooperating with said operating piston to provide a checking chamber to receive liquid released from said liquid receiving chamber so as to check the outward movement of both pistons and reverse the movement of said operating piston so that it meets the expelling piston as it moves outwardly, said piston member thereafter being operable to cut off the said liquid receiving chamber from the above named checking chamber and thereafter being movable under its loading to expel liquid from said checking chamber to waste.

16. In an internal combustion engine, the combination of a housing, a mixture expelling piston movable in said housing having a head end exposed to the combustion space of the engine and having a bore extending to its head end and which bore is in constant restricted communication with said combustion space, a second piston working in said bore and forming with said first piston a prechamber adapted to receive air through said restricted communication, means for supplying a metered charge of fuel to said prechamber to form a mixture of fuel and air, means operable near the end of the compression stroke of the engine to control the beginning of the outward movement of said first piston to expel said mixture of fuel and air through said restricted communication directly into said combustion space, and means for stopping the outward movement of said last named piston.

17. In an internal combustion engine, the combination of a housing, a mixture expelling piston movable in said housing having a head end exposed to the combustion space of the engine and having a bore extending to its head end and which bore is in constant restricted communication with said combustion space, said piston cooperating with said housing to form a checking chamber adapted to receive a checking liquid, a second piston working in said bore and forming with said first piston a prechamber adapted to receive air through said restricted communication, means for supplying a metered charge of fuel to said prechamber, timing means for releasing checking liquid from said checking chamber to permit said first named piston to move outwardly to force fuel and air from said prechamber into said combustion space, and means for stopping the release of checking liquid from said checking chamber to trap liquid therein to stop the outward movement of said first named piston.

References Cited in the file of this patent

UNITED STATES PATENTS 2,203,669   Butler _____ June 11, 1940